C. HARTZELL.
Plows.
No. 134,377. Patented Dec. 31, 1872.
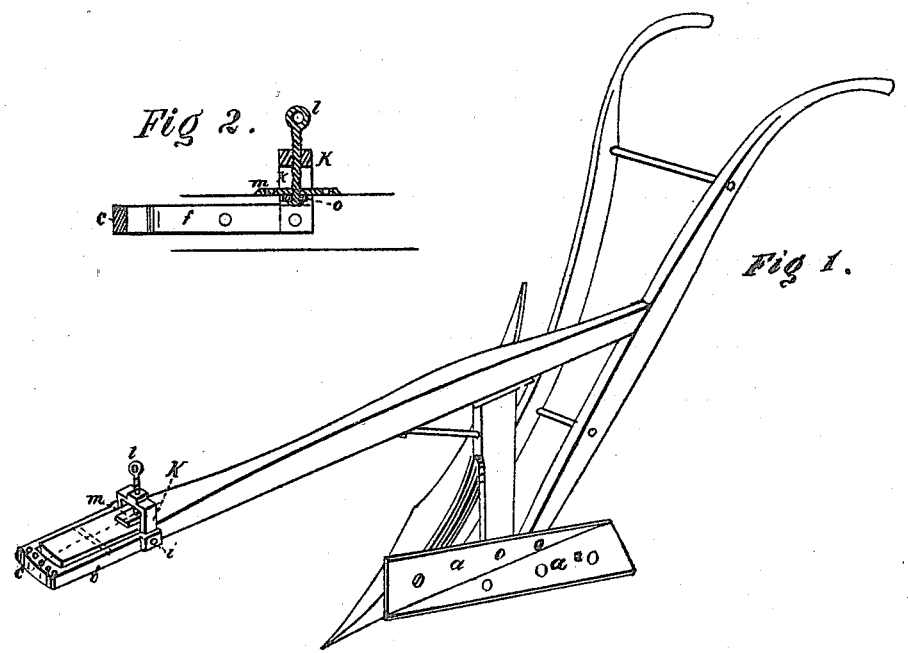
Witnesses
Edwin J. McLain
John Williams
Inventor
Conrad Hartzell
by
S. M. Pool

UNITED STATES PATENT OFFICE.

CONRAD HARTZELL, OF ST. JOSEPH, MISSOURI.

IMPROVEMENT IN PLOWS.

Specification forming part of Letters Patent No. 134,377, dated December 31, 1872; antedated December 24, 1872.

*To all whom it may concern:*

Be it known that I, CONRAD HARTZELL, of St. Joseph, county of Buchanan, in the State of Missouri, have invented a new and useful Improvement in Plows; and I declare the following to be a full, clear, and exact description of the same, such as will enable others skilled in the art to which it pertains to make and use it, reference being had to the accompanying drawing which forms a part of this specification.

The principal object of my invention is to plow the ground more effectually than is done with other plows, and to lessen the draft and labor required, by means of the combination of the vertical cutting-colter with the horizontal cutting-blade or share on the land-side of the plow, to keep the same more steady in its action. I, therefore, firstly, provide the land-side of the plow with a vertical cutting blade or colter, in combination with a horizontal cutting-share. This colter is formed similarly with the horizontal share, only reversed in shape, the two blades being made of one piece of metal, and may be reversed at option. Either of the blades may answer for colter or horizontal share. The object of this arrangement is to keep the plow more steady in its action, to cut the ground vertically, and to underscore it at the same time, so that the ground will be more readily and easily turned over at the next passage of the plow, and at a material saving of draft. Secondly, I have provided the clevis at the end of the plow-beam with a regulating-screw of new construction, in combination with the back-band, its object being to keep the clevis steady in its position at all times.

To enable others skilled in the art to which it pertains to make and use my invention, I will proceed to describe it with reference to the drawing.

Figure 1 is a view in perspective of the plow. Fig. 2 is sectional view of the clevis $f$, back-band K, regulating-screw $l$, &c.

A is vertical cutting blade or colter, fastened in any suitable manner to the land-side of the plow. In connection with this colter, and at right angles thereto, is the horizontal share $A^2$. Both these cutting-blades are elongated triangular shaped, but reversed in relation to each other, and made of one piece of metal, and in such manner that either blade may become alternately a colter, the other blade taking its place. K is is the back-band, fastened to shank $f$ by means of pins $i\ i$. Through band K passes the regulating-screw $l$. Its lower end passes through the plate M, and is headed loosely beneath. The screw $l$ therefore holds the band K rigidly at any required position. The plate M is fastened securely to the plow-beam.

This clevis device I claim as an improvement upon that shown in my patent of June 1, 1869.

What I claim as my invention, and desire to secure by Letters Patent, is—

1. The triangular, elongated, vertical, and horizontal cutting-blades, or colter A and share $A^2$ attached to the land-side of a plow for the purpose described.

2. The regulating-screw $l$, the perforated plate M, swivel O, and back-band K, connecting the shanks $f$ by the pins $i\ i$, in combination, substantially as and for the purpose specified.

CONRAD HARTZELL.

Witnesses:
W. G. SWAN,
A. D. KIRK.